United States Patent
Jiang et al.

(10) Patent No.: US 10,460,153 B2
(45) Date of Patent: Oct. 29, 2019

(54) AUTOMATIC IDENTITY DETECTION

(71) Applicant: Futurewei Technologies, Inc., Plano, TX (US)

(72) Inventors: Wei Jiang, San Jose, CA (US); Wei Wang, San Jose, CA (US)

(73) Assignee: Futurewei Technologies, Inc., Plano, TX (US)

(*) Notice: Subject to any disclaimer, the term of this patent is extended or adjusted under 35 U.S.C. 154(b) by 385 days.

(21) Appl. No.: 15/352,301

(22) Filed: Nov. 15, 2016

(65) Prior Publication Data
US 2018/0137345 A1    May 17, 2018

(51) Int. Cl.
*G06K 9/00* (2006.01)
*G06K 9/46* (2006.01)
*G06K 9/62* (2006.01)

(52) U.S. Cl.
CPC ..... *G06K 9/00288* (2013.01); *G06K 9/00201* (2013.01); *G06K 9/00228* (2013.01); *G06K 9/00268* (2013.01); *G06K 9/00979* (2013.01); *G06K 9/4628* (2013.01); *G06K 9/4652* (2013.01); *G06K 9/627* (2013.01)

(58) Field of Classification Search
None
See application file for complete search history.

(56) References Cited

U.S. PATENT DOCUMENTS

| | | | | |
|---|---|---|---|---|
| 8,553,983 B2 * | 10/2013 | Imaoka | ............... | G06F 21/32 382/118 |
| 2006/0104504 A1 * | 5/2006 | Sung | ............... | G06K 9/00281 382/159 |
| 2011/0135167 A1 * | 6/2011 | Imaoka | ............... | G06F 21/32 382/118 |
| 2013/0155063 A1 * | 6/2013 | Solem | ............... | G06K 9/00221 345/420 |
| 2014/0105467 A1 * | 4/2014 | Myers | ............... | G06K 9/00288 382/118 |
| 2016/0132720 A1 * | 5/2016 | Klare | ............... | G06F 16/51 382/118 |
| 2016/0261911 A1 * | 9/2016 | Soundararajan | .... | G06F 16/5838 |
| 2018/0268207 A1 * | 9/2018 | Kim | ............... | G06T 13/80 |

FOREIGN PATENT DOCUMENTS

| | | |
|---|---|---|
| WO | 2016026063 A1 | 2/2016 |
| WO | 2016119076 A1 | 8/2016 |

* cited by examiner

*Primary Examiner* — Iman K Kholdebarin
(74) *Attorney, Agent, or Firm* — Futurewei Technologies, Inc.

(57) ABSTRACT

In an embodiment, the disclosure includes an object detecting device. The object detecting device is configured to execute the instructions to: obtain a first picture comprising a first object at a first time instant; determine a first feature pattern of the first object based on the first picture; generate a first feature map of the first object based on the first feature pattern; generate a first feature vector of the first object based on the first feature map; and send the first feature vector to a server. In this embodiment, the first feature vector is generated based on the first feature map by the object detecting device rather than starting another process of directly generating the first feature map based on the first picture. Therefore, the speed and the computing resource cost of generating the feature vector may be better.

20 Claims, 4 Drawing Sheets

AUTOMATIC IDENTITY DETECTION

CROSS-REFERENCE TO RELATED APPLICATIONS

Not applicable.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Intelligent identity recognition is an important ability for an automatic control system, such as an automatic control system in a robot. Being able to detect and recognize human faces is essential in a variety of applications, such as home security and surveillance, as well as personalization and natural user-robot interaction. The recent significant advances in face detection and face recognition by using deep neural networks make it possible to handle several challenging conditions: large pose variations, difficult lighting conditions, etc. However, some issues remain unsolved for practical systems to operate in personalized home environments, such as limitations in computing powers.

SUMMARY

In one embodiment, the disclosure includes a method for detecting identification. The method includes: obtaining, by an object detecting device, a first picture comprising a first object at a first time instant; determining, by the object detecting device, a first feature pattern of the first object based on the first picture; generating, by the object detecting device, a first feature map of the first object based on the first feature pattern; generating, by the object detecting device, a first feature vector of the first object based on the first feature map; and sending, by the object detecting device, the first feature vector to a server. In this embodiment, the first feature vector is generated based on the first feature map rather than starting another process of directly generating the first feature map based on the first picture. Therefore, the speed and the computing resource cost of generating the feature vector may be better.

In another embodiment, the disclosure includes an object detecting device. The object detecting device comprises a non-transitory memory comprising instructions and a processor in communications with the memory. The processor is configured to execute the instructions to: obtain a first picture comprising a first object at a first time instant; determine a first feature pattern of the first object based on the first picture; generate a first feature map of the first object based on the first feature pattern; generate a first feature vector of the first object based on the first feature map; and send the first feature vector to a server. In this embodiment, the first feature vector is generated based on the first feature map by the object detecting device rather than starting another process of directly generating the first feature map based on the first picture. Therefore, the speed and the computing resource cost of generating the feature vector may be better.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

It should be understood at the outset that, although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

In some embodiments, an object detecting device may obtain a picture comprising an object, where the object may be a person or a robot. The object detecting device may determine a feature pattern of the object such as the face of the person, based on the picture. The object detecting device may further generate a feature map based on the feature pattern. Based on the feature map rather than directly based on the picture, the object detecting device may generate a feature vector and send the feature vector to a server for object identification. Because the feature vector is generated based on the feature map and the server performs object identification directly based on the received feature vector, the speed and the computing resource cost of generating the feature vector may be better than generating the feature vector directly based on the picture. In some embodiments, because the object detecting device may transmit a vector rather than a picture to the server, the data transferring cost of transferring the vector may be better than that of transferring the picture.

Figure 1:
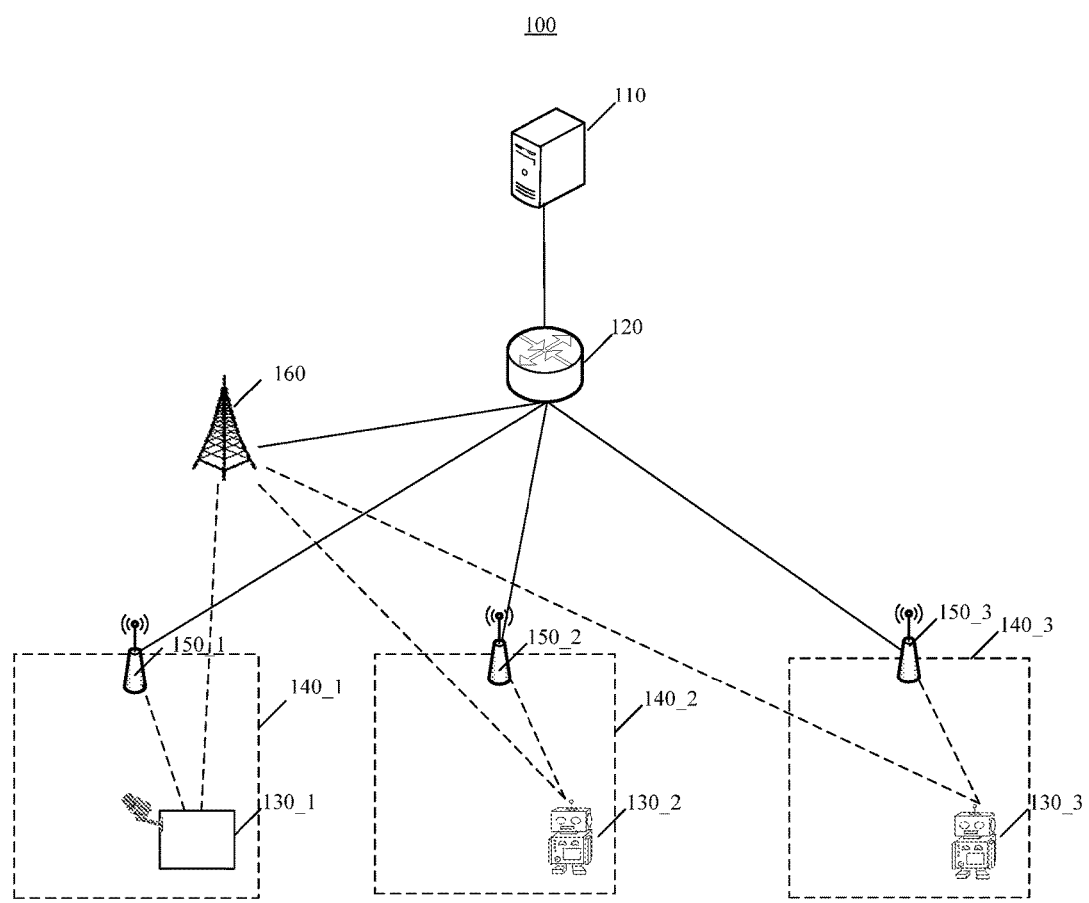
FIG. 1 illustrates a schematic diagram of network 100 according to an embodiment of the disclosure.

FIG. 1 illustrates a schematic diagram of network 100 according to an embodiment of the disclosure. As shown in FIG. 1, network 100 includes server 110, router 120, and object detecting device 130_1, object detecting device 130_2, and object detecting device 130_3 (object detecting devices 130_1 to 130_3 may be collectively called object detecting devices 130). Although FIG. 1 shows three object detecting devices 130, fewer or more object detecting devices may be coupled router 120. In some embodiments, each of the plurality of object detecting devices 130 may be located in a respective area. As shown in FIG. 1, object detecting devices 130_1, 130_2, and 130_3 are located in areas 140_1, 140_2 and 140_3 (collectively called areas 140), respectively. Even though FIG. 1 shows one object detecting device for each area, in alternative embodiments, each area, such as area 140_1, may have one or more object detecting devices 130. In some embodiments, object detecting devices 130_1, 130_2, and 130_3 may communicatively coupled with router 120 via Wi-Fi routers 150_1, 150_2, and 150_3 (collectively, called Wi-Fi routers 150), respectively. In some embodiments, object detecting devices 130 may communicatively connect with router 120 via base station 160. Router 120 is coupled to server 110.

In some embodiments, each of areas 140, as illustrated in FIG. 1, may be one or more rooms or buildings. For example, some of areas 140 may be independent rooms and the remaining of areas 140 may be independent buildings.

One of object detecting devices 130 may be a movable electronics robot with an appearance similar to a human being, such as object detect device 130_2 or 130_3. Alternatively, one of object detecting devices 130 may be a moveable or fixed electronics device without the appearance similar to a human being, such as object detect device 130_1. Object detecting device 130_1 may be a personal computer, a smart phone, a personal digital assistant (PDA), a laptop, or a tablet. In one embodiment, each of object detecting devices 130 may include a camera to capture pictures of a corresponding area of areas 140. For example, the camera in object detecting device 130_1 may be used to take pictures of objects in area 140_1 in which object detecting device 130_1 is located. The camera in each of object detecting devices 130 may include a light sensor, heat sensor, or the combination of a light sensor and a heat sensor. In an alternative embodiment, at least one of object detecting devices 130 may include an interface without any camera, and the interface may be used to couple to an external camera outside the at least one of object detecting devices 130 so that the at least one of object detecting devices 130 may receive images taken by the external camera via the interface.

In order to communicate with router 120 via Wi-Fi routers 150 or base stations 160, each of object detecting devices 130 may be equipped with a hardware communication module. The hardware communication module may be an interface of a wired network, such as an Ethernet interface card, a wireless local access network (WLAN) unit, such as a Wi-Fi unit, or a mobile telecommunication unit, such as a Global System for Mobile communication (GSM) unit, a Code Division Multiple Access (CDMA) unit, a Wideband Code Division Multiple Access (WCDMA) unit, a CDMA 2000 unit, a Long Term Evolution (LTE) unit, where the mobile telecommunication unit may require a physical or virtual Serving In Mission (SIM) card or SIM identifier.

The communicative connection or forwarding between any two devices in network 100 may be direct or indirect via at least an intermediate device. In some embodiments, server 110 may be located close to object detecting devices 130 so that server 110 may couple with object detecting devices 130 without any router or any other intermediate device.

In some embodiments, router 120 may be a traditional IP router or a forwarding device in SDN. Server 110 and router 120 may be in the same domain or in different domains. Router 120 and server 110 may be coupled via IP connection, Label Switched Path (LSP) and/or Pseudo Wire (PW).

Figure 2:
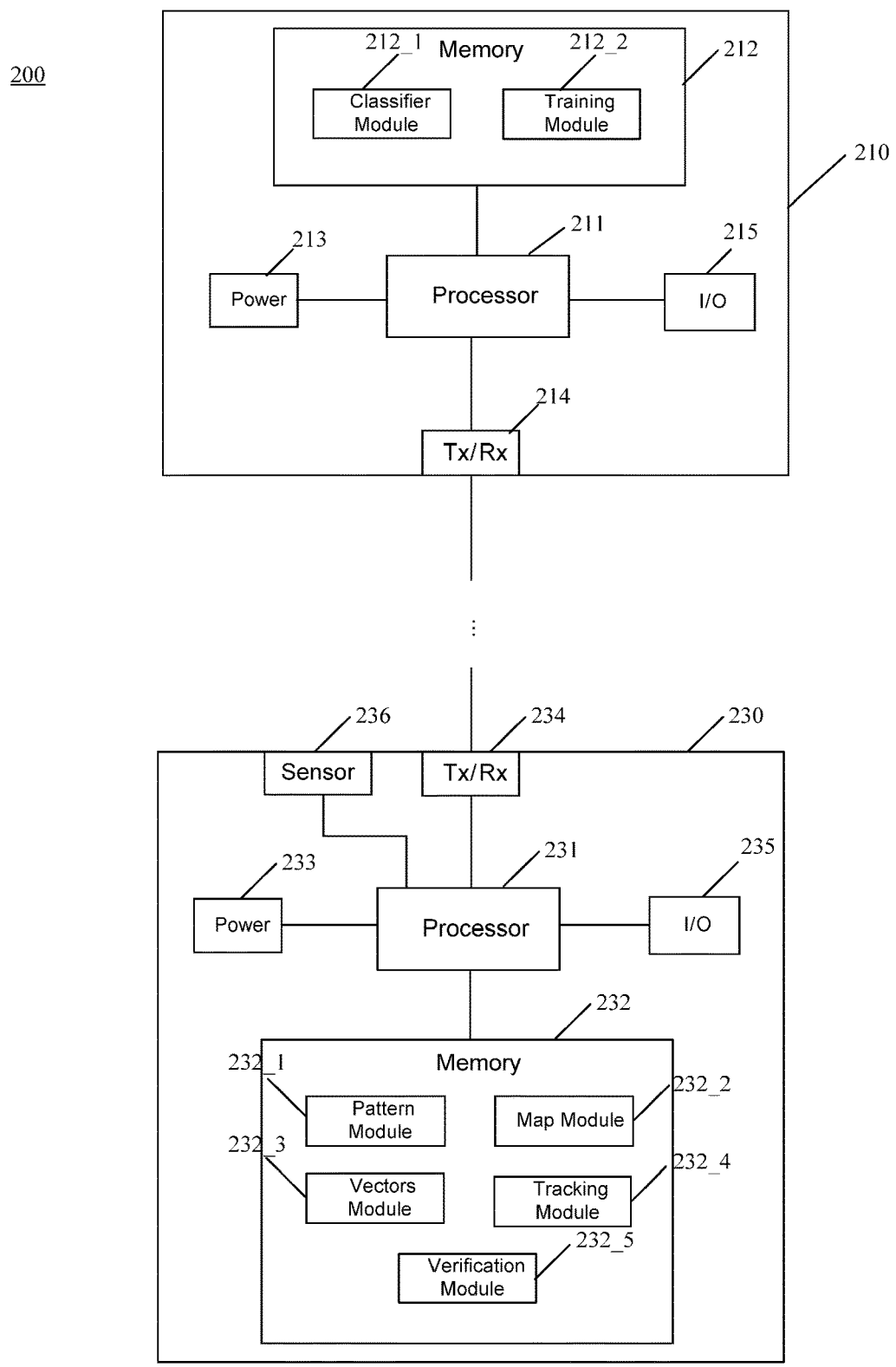
FIG. 2 illustrates a schematic diagram of network 200 according to an embodiment of the disclosure.

FIG. 2 illustrates a schematic diagram of network 200 according to an embodiment of the disclosure. Network 200 may include server 210 and object detecting device 230. In some embodiments, network 200 may be considered as a simplified network 100 or a portion of network 100, and server 210 may be the same as server 110 in FIG. 1 and object detecting device 230 may be the same as any of object detecting devices 130. In network 200, the communicative connection between server 210 and object detecting device 230 may include a wired connection, a wireless connection, or a combination of a wired connection and a wireless connection. For example, object detecting device 230 may be coupled with server 210 via Wi-Fi routers 150 and router 120 in the network as illustrated in FIG. 1. In another example, objet detecting device 230 may be couple with server 210 via base station 160 and router 120 in the network as illustrated in FIG. 1.

Object detecting device 230 may include processor 231, memory 232, power supply 233, transmitting/receiving (Tx/Rx) device 234 and Input/Out (I/O) device 235. In some embodiments, processor 231 may include one or more processors. Processor 231 may be implemented as a general processor or may be part of one or more application specific integrated circuits (ASICs) and/or digital signal processors (DSPs).

In some embodiments, memory 232, power supply 233, Tx/Rx device 234 and I/O device 235 may all be coupled with processor 231 via a bus or a dedicated connection. Memory 232 may be a random access memory (RAM), such as a dynamic RAM (DRAM) or a static RAM (SRAM), a read only memory (ROM). In some embodiments, Memory may be a solid-state drive (SSD) or a hard disk drive (HDD). Memory 232 may include software modules, such as pattern module 232_1, map module 232_2 and/or vector module 232_3. Processor 231 may read computer-readable codes or instructions in a software module of memory 232 to enable object detecting device 230 to perform one or more actions or operations.

In some embodiments, Tx/Rx device 234 may include an antenna that is used to transmit and receive wireless signals, such as Wi-Fi signals, WCDMA signals and/or LTE signals. In some embodiments, Tx/Rx device 234 may include a network interface used to couple with a cable, such as an. Ethernet cable.

In some embodiments, sensor 236 may be a light sensor, heat sensor, or the combination of a light sensor and a heat sensor. The sensor may be used to take pictures of objects.

Server 210 may include processor 211, memory 212, power supply 213, transmitting/receiving (Tx/Rx) device 214 and Input/Out (I/O) device 215. In some embodiments, processor 211 may include one or more processors. Processor 211 may be implemented as a general processor or may be part of one or more application specific integrated circuits (ASICs) and/or digital signal processors (DSPs).

In some embodiments, memory 212, power supply 213, Tx/Rx device 214 and I/O device 215 may all be directly or indirectly coupled with processor 211 via a bus or a dedicated connection. Memory 212 may be a random access memory (RAM), such as a dynamic RAM (DRAM) or a static RAM (SRAM), a read only memory (ROM). In some embodiments, Memory may be a solid-state drive (SSD) or a hard disk drive (HDD). Memory 212 may include software modules, such as classifier module 212_1 and training module 212_2. Processor 211 may read computer-readable codes or instructions stored in a software module of memory 212 to enable server 210 to perform one or more actions or operations.

In some embodiments, Tx/Rx device 214 may include an antenna that is used to transmit and receive wireless signals, such as Wi-Fi signals, WCDMA signals and/or LTE signals. In some embodiments, Tx/Rx device 214 may include a network interface used to couple with a cable, such as an Ethernet cable.

In some embodiments, pattern module 232_1 in object detecting device 230 may be used to determine or identify a feature pattern of an object included in a picture captured or received by object detecting device 230. In some embodiments, the feature pattern is obtained based on one or more particular features of the object. For example, if the object is a person, the particular features of the object may be the face of the person. In some embodiments, the particular feature of the object may be associated with a distinguishing pattern of the object or carried by the object. Map module 232_2 may be used to generate a feature map of the object based on the feature pattern. In some embodiments, the feature map of the object may include some three-dimensional (3D) features in the feature pattern of the object. Vector module 232_3 may be used to generate a feature vector of the object based on the feature map of the object. In some embodiments, the feature vector of the object may include some one-dimensional (1-D) features generated based on the feature map. After the feature vector is generated for the object, vector module 232_3 may also be used to send the feature vector to server 210 via. Tx/Rx device 234 so that server 210 may determine, based on the received feature vector, whether the object may be recognized. In some embodiments, when server 210 recognizes a feature vector, it may refer to recognizing the object associated with the feature vector or determining the identity of the object associated with the feature vector. Determining or recognizing the identity of the object may refer to determining the identifier of the object. In other words, recognizing a feature vector may refer to recognizing the identity of the object associated with the feature vector. In some embodiments, a picture captured or received by object detecting device 230 may include a plurality of objects. Pattern module 232_1 may determine the feature pattern of each object, or may determine some feature patterns of some of the objects, or may determine a feature pattern of one of the objects.

In some embodiments, object detecting device 230 may capture or receive a plurality of pictures, each or some of which may respectively include one or more objects. Pattern module 232_1 may determine the feature patterns of some or all objects in the plurality of pictures.

Object detecting device 230 may generate feature maps and a plurality of feature vectors, based on each or some of the feature patterns. Therefore, the quantity of the feature vectors may be the same as or less than the quantity of the feature patterns.

In some embodiments, memory 232 of object detecting device 230 may further include tracking module 232_4. Tracking module 232_4 may be used to obtain some basic pattern information of a particular feature of an object in a picture captured or received by object detecting device 230. In some embodiments, the particular feature of an object may be the face of a person, a robot or an animal. The basic pattern information of a particular feature of an object may be referred to as the basic pattern information of the object. The basic pattern information may be obtained from the feature pattern or the picture of the object by means of selection or calculation. The basic pattern information may be received from another device. The basic pattern information may be salient interest points, such as corners or lines in the feature pattern. Tracking module 232_4 may use the basic pattern information to track the object.

For example, object detecting device 230 may obtain basic pattern information of a first object. Furthermore, object detecting device 230 may keep capturing or receiving pictures because object detecting device may have a sensor used for capturing pictures and may use. Tx/Rx device 234 to receive pictures taken by a camera in the network. Tracking module 232_4 may rapidly obtain the basic pattern information of a second object in a captured or received picture. The basic pattern information of an object is much simpler than a feature pattern associated with the basic pattern. Therefore, the speed of obtaining the basic pattern information of an object is faster or better than the speed of obtaining the feature pattern associated with the basic pattern. Tracking module 232_4 may further determine whether the basic pattern information of the second object is the same as the basic pattern information of the first object or is similar to the basic pattern information of the first object. If the basic pattern information of a second object is the same as the basic pattern information of the first object or is similar to the basic pattern information of the first object, the second object and the first object may be determined as one same object.

In some embodiments, tracking module 232_4 may send tracking information to server 210 to indicate that the plurality of feature vectors sent by the vector module 232_3 are feature vectors of the same object. For example, tracking module 232_4 may indicate that first ten feature vectors of a plurality of feature vectors are feature vectors of the same object. Each of the first ten feature vectors may correspond to an identified feature pattern of the same object.

In some embodiments, tracking module 232_4 may track a plurality of objects. In an example, tracking module 232_4 may track a first object and a second object. Tracking module 232_4 may send tracking information to server 210, where the tracking information indicates that a first portion of a plurality of feature vectors sent by vector module 232_3 to the server are feature vectors of the first object and a second portion of the plurality of feature vectors sent by vector module 232_3 to the server are feature vectors of the second object. More particularly, vector module 232_3 may send feature vectors 1-20 to server 210, and tracking module 232_4 may send tracking information to server 210 indicating that feature vectors 1-10 are feature vectors of the first object and feature vectors 11-20 are feature vectors of the second object.

In some embodiments, memory 232 may further include verification module 232_5. When object detecting device 230 receives a verification instruction associated with an object from server 210, verification module 232_5 may perform verification on the object. If the object passes the verification, verification module 232_5 may obtain the identifier of the object, such as the name of a person, by sending a request to the object, and then send the identifier of the object to server 210.

In some embodiments, when a feature vector of an object is received by server 210, classifier module 212_1 in memory 212 may determine whether the object can be recognized. If the object associated with the feature vector can be recognized to be associated with a known identity, training module 212_2 may use the feature vector to update the ability of recognizing the identity of the object so that the ability of recognizing the identity of the object may be improved. For example, after classifier module 212_1 determines the identity of the object associated with the feature vector, training module 212_2 may use the feature vector received by server 210 as additional training data to train or improve the ability of recognizing the identity, and the classifier module 212_1 may be updated with the improved recognition ability. In some embodiments, recognizing an object may refer to recognizing the identity of the object. The identity of the object may be indicated by the identifier of the object.

If the object associated with a feature vector cannot be recognized by classifier module 212_1 as associated with any known identity, classifier module 212_1 may send a verification instruction associated with the object to object detecting device 230 so that object detecting device 230 may perform verification on the object. If the verification performed by object detecting device 230 is successful, object detecting device 230 may request the identity of object. Furthermore, object detecting device 230 may send the identity of the object to server 210. Classifier module may associate the identity of the object with the feature vector. Training module 212_2 in server 210 may use the feature vector received by server 210 to train the ability of recognizing the identity of the object, and the classifier module 212_1 may be updated with the ability of recognizing the identity of the object.

In some embodiments, server 210 may receive a plurality of feature vectors, e.g., feature vectors 1-20. Classifier module 212_1 may recognize some of the feature vectors. For example, classifier module 212_1 may recognize that the first and the second feature vectors are feature vectors of the first object and the fourteenth feature vector is feature vector of the second object. Server 210 may further receive information from the object detecting device 230 indicating that feature vectors 1-10 are feature vectors of one object and feature vectors 11-20 are feature vectors of another object. Accordingly, classifier module 212_1 may determine that feature vectors 1-10 are associated with the first object, and feature vectors 11-20 are associated with the second object. Furthermore, training module 212_2 may use feature vectors 1-10 to train or improve the ability of recognizing the first object and use feature vectors 11-20 to train or improve the ability of recognizing the second object. In some embodiments, recognizing an object refers to recognizing the identity of the object.

Figure 3:
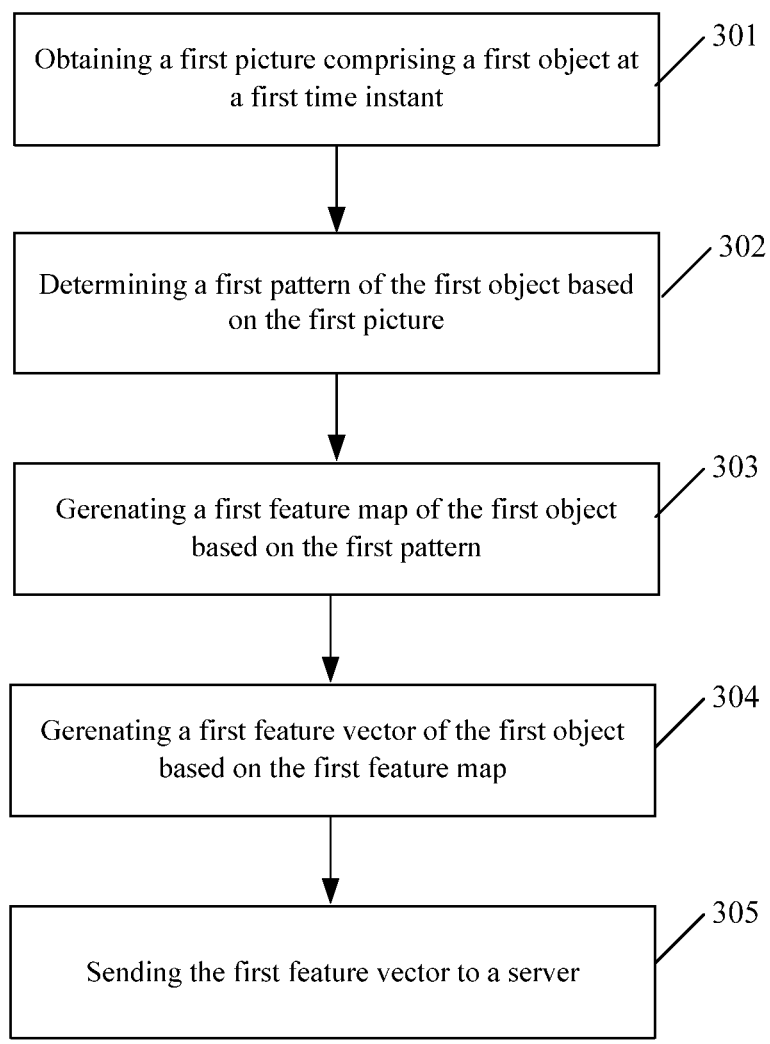
FIG. 3 illustrates a flow chart of a method 300 according to an embodiment of the disclosure.

FIG. 3 illustrates a flow chart of a method 300 according to an embodiment of the disclosure. Method 300 may be performed by an object detecting device, such as object detecting devices 130_1, 130_2 or 130_3 as illustrated in FIG. 1, or object detecting device 230 as illustrated in FIG. 2.

At operation 301, the object detecting device may obtain a first picture comprising a first object at a first time instant. In some embodiments, the first picture may be received from another device or captured by the object detecting device via a sensor of the object detecting device. The sensor may be a light sensor, a heat sensor or a combination of a light sensor and a heat sensor. The first picture may be a colorful photograph, such as a red, green and blue (RGB) picture, or a black and white picture. In some embodiments, the first picture may be a photo or a pattern. In some embodiments, operation 301 may be performed by sensor 236 or. Tx/Rx 234 in object detecting device 230.

At operation 302, the object detecting device may determine a first feature pattern of the first object based on the first picture. In some embodiments, a feature pattern of an object may be a pattern of a particular feature of the object, where the particular feature distinguishes the object from other objects. For example, the feature pattern of a person may be the face of the person that distinguishes this person from animals, such as a dog or a cat. The first feature pattern may be determined by applying a plurality of layers of spatial-domain operations on the first picture. The input of operation layer i is the output of the previous operation layer i−1, which is a 3-D data cube of size ($X_i$, $Y_i$, $C_i$). Each datum in the data cube is a number of a known type, such as 32-bit float. The input of the very first operation layer is the pixel values of the first picture, where $X_1$ is width of the picture, $Y_1$ is the height of the picture, and $C_1$ is the signal channel of the picture, such as the green and blue (RGB) channel or the gray channel (black and white picture). In each layer, the spatial-domain operations can be the two-dimensional (2-D) filters within each of the channels of the input data cube of the operation layer or the 3-D filters across different channels of the input data cube of the operation layer. Each channel is a slice of the input data cube with size ($X_i$,$Y_i$). For example, a 2-D spatial-domain filter can generate one value for a datum in the input data cube based on the surrounding data in a local neighborhood of the datum in the input data cube, and the local neighborhood is within a channel of the input data cube. A 3-D spatial-domain filter can generate one value for a datum in the input data cube based on the surrounding data in a local neighborhood of the datum of the input data cube, and the local neighborhood is across multiple channels. A region determination layer may be used after the plurality of layers of spatial-domain operations, where a location is determined for the object in the picture. For example, the convolutional layers described by K. Simonyan and A. Zisserman in article "Very deep convolutional networks for a large-scale image recognition," published in ICLR 2015 can be used as the plurality of spatial-domain operation layers. The region proposal network described by S. Ren and et al. in article "Faster-rcnn: towards real-time object detection with region proposal networks," published in NIPS 2015, can be used as the region determination layer. In some embodiments, operation 302 may be performed by pattern module 232_1 in object detecting device 230.

At operation 303, the object detecting device may generate a first feature map of the first object based on the first feature pattern. In some embodiments, a feature map based on a feature pattern may include three-Dimensional (3-D) parameters computed from the feature pattern. For example, the first feature map may include 3-D parameters computed by applying a plurality of layers of spatial-domain aggregating operations to the first feature pattern. The input of operation layer j is the output of the previous operation layer j−1, which is a 3-D data cube of size ($X_j$, $Y_j$, $C_j$). Each datum in the data cube is a number of a known type, such as 32-bit float. The input of the very first operation layer is the feature pattern generated by operation 302. In each layer, the spatial-domain aggregating operations can be the 2-D aggregating filter within the channels of the input data cube of the operation layer, or the 3-D aggregating filter across channels of the input data cube of the operation layer. For example, a 2-D aggregating filter can generate one value for a datum in the output data cube based on the surrounding data in a local neighborhood of the datum in the input data cube, and the local neighborhood is within a channel of the input data cube. A 3-D aggregating filter can generate one value for a datum in the output data cube based on the surrounding data in a local neighborhood of the datum of the input data cube, and the local neighborhood is across multiple channels. The output of the last operation layer is the feature map. For example, the RoI pooling layer described by R. Girshick in article "Fast r-cnn," published in ICCV 2015 can be used to generate the feature map based on the feature pattern. In some embodiments, operation 303 may be performed by map module 232_2 in object detecting device 230.

At operation 304, the object detecting device may generate a first feature vector of the first object based on the first feature map. In some embodiments, a feature vector of an object may include one-Dimensional (1-D) parameters derived from the feature map of the object. The feature vector is derived from the feature map by applying a plurality of operation layers to the feature map of the object. The input of operation layer k is the output of the previous operation layer k−1, which is a 3-D data cube of size ($X_k$, $Y_k$, $C_k$). Each datum in the data cube is a number of a known type, such as 32-bit float. The input of the very first operation layer is the feature map generated by operation 303. In each layer, each datum of the output data cube is computed by first weighted combining all data of the input data cube and then applying a non-linear function to the weighted combined value. The output of the last operation layer is the feature vector. For example, the last few layers of the network described by F. Schroff et al. in "Facenet: a unified embedding for face recognition and clustering," published in CVPR 2015, including the fully connected layers and the L2 normalization layer, can be used as the operation layers to derive the feature vector from the feature map. In some embodiments, operation 304 may be performed by vector module 232_3 in object detecting device 230.

At operation 305, the object detecting device may send the first feature vector to a server. In some embodiments, the server may be server 110 as illustrated in FIG. 1 or the server 210 as illustrated in FIG. 2. In some embodiments, operation 305 may be performed by. Tx/Rx device 234 in object detecting device 230.

Because the first feature vector is generated based on the first feature map, rather than generated directly based on the first picture, the first feature vector is obtained efficiently.

In some embodiments, the object detecting device may receive a message from the server, where the message instructs the object detecting device to perform verification on the first object. In some embodiments, such message may be sent by the server when the server fails to recognize the first object as associated with any known identity. After receiving the message, the object detecting device may perform the verification on the first object. For example, the object detecting device may request the first object to input a password so that the object detecting device may determine whether the verification on the first object is successful. When the verification is successful, the object detecting device may request the first object to input the identifier of the first object. After receiving the identifier of the first object from the first object, the object detecting device may send the identifier of the first object to the server. An identifier of an object may indicate the identity of the object.

In some embodiments, the object detecting device may further obtain a second picture comprising a second object at a second time instant. The object detecting device may further generate a second feature vector of the second object based on the second picture. For example, the object detecting device may determine a second feature pattern based on the second picture, generate a second feature map of the second object based on the second feature pattern, and then generate the second feature vector based on the second feature map. After generating the second feature vector, the object detecting device may send the second feature vector of the second object to the server.

In some embodiments, the object detecting device may further determine whether the first feature vector and the second feature vector are associated with one same object. Furthermore, the object detecting device may inform the server whether the first feature vector and the second feature vector are associated with one same object.

In the scenarios that the first feature vector and the second feature vector are associated with one same object, the first object and the second object are actually the same. In such scenarios, if the server recognizes the first object based on the first feature vector, the server may further recognize the second object without the process of recognizing the second feature vector.

In some embodiments, if the sever may recognize a feature vector, the server may use the recognized feature vector to train or improve the ability of recognize the object associated with the feature vector. Furthermore, based on the recognized feature vector, the server may further generate some updating information which may be used for improving an algorithm used by the object detecting device for generating a feature vector of an object. For example, the algorithm can be the parameters of the plurality of spatial-domain operation layers in operation 302, the parameters of the plurality of spatial-domain aggregation layers in operation 303, or the parameters of the plurality of operation layers in operation 304. After receiving the updating information from the server, the object detecting device may consequently update the algorithm based on the updating information.

Figure 4:
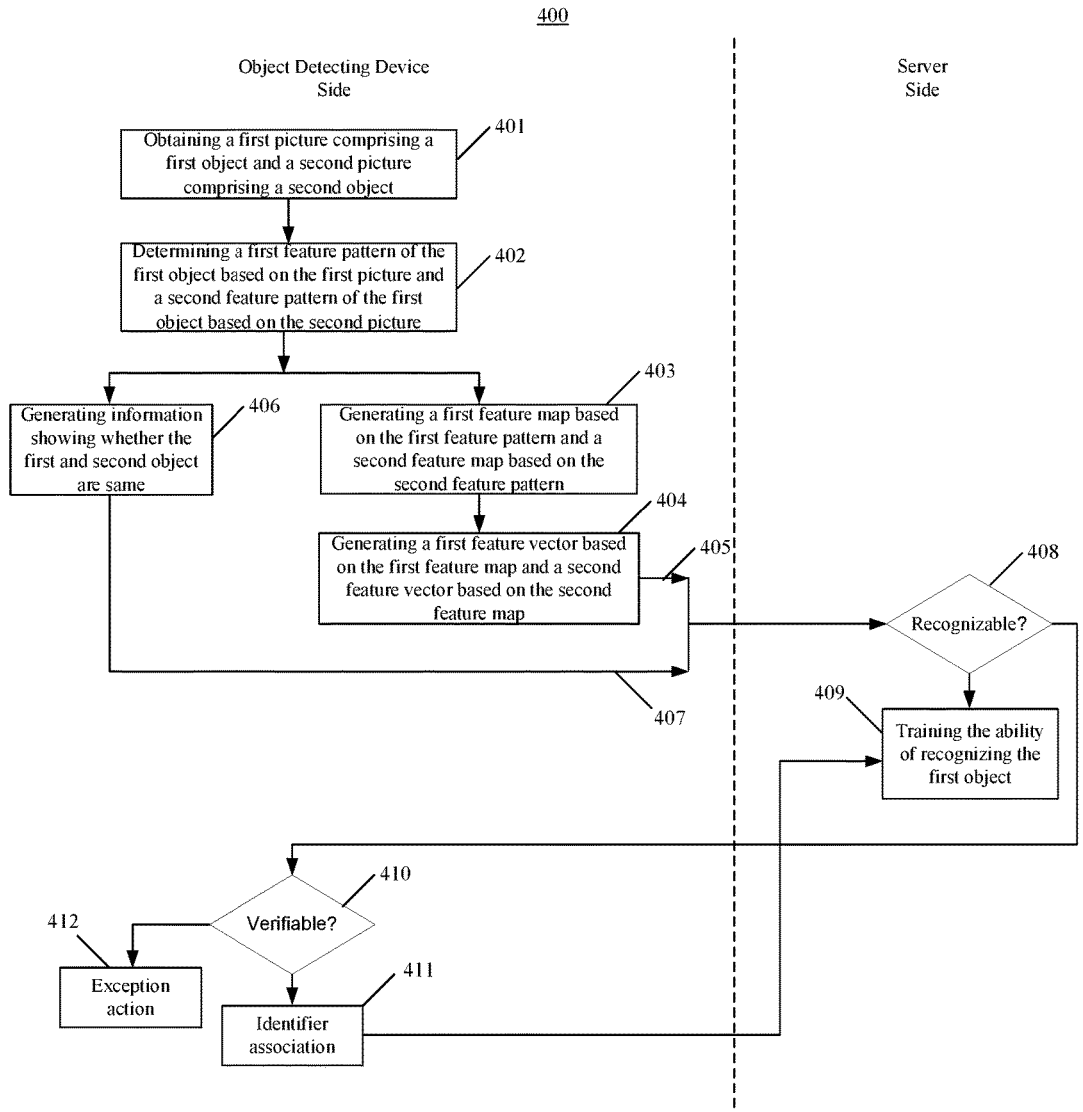
FIG. 4 illustrates a flow chart of a method 400 according to an embodiment of the disclosure.

FIG. 4 illustrates a flow chart of a method 400 according to an embodiment of the disclosure. Method 400 may be performed by a server, such as server 110 in FIG. 1 and server 210 in FIG. 2, and an object detecting device, such as one of object detecting devices 130 in FIG. 1 and object detecting device 230 in FIG. 2. Some of the operations shown in FIG. 4 are performed by the server and some of the operations shown in FIG. 4 are performed by the object detecting device.

At operation 401, the object detecting device may obtain a first picture comprising a first object at a first time instant. The object detecting device may optionally further obtain a second picture comprising a second object at a second time instant.

In some embodiments, the first picture and the second picture may be received from another device or captured by the object detecting device via a sensor of the object detecting device. The sensor may be a light sensor, a heat sensor or a combination of a light sensor and a heat sensor. The first picture may be a colorful photograph, such as a red, green and blue (RGB) picture, or a black and white picture. In some embodiments, a picture may be a photo or a pattern. In some embodiments, operation 401 may be performed by sensor 236 or. Tx/Rx 234 in object detecting device 230.

At operation 402, the object detecting device may determine a first feature pattern of the first object based on the first picture. The object detecting device may optionally further determine a second feature pattern of the second object based on the second picture. A feature pattern of an object is a pattern which distinguishes the object from other objects. For example, the feature pattern of a person may be the face of the person. In some embodiments, operation 402 may be performed by pattern module 232_1 in object detecting device 230.

At operation 403, the object detecting device may generate a first feature map of the first object based on the first feature pattern. The object detecting device may optionally further generate a second feature map of the second object based on the second feature pattern. A feature map based on a feature pattern may include 3-D features in the feature pattern. In some embodiments, operation 403 may be performed by map module 232_2 in object detecting device 230.

At operation 404, the object detecting device may generate a first feature vector of the first object based on the first feature map. Furthermore, the object detecting device may optionally generate a second feature vector of the second object based on the second feature map. A feature vector of an object may include 1-D features derived from the feature map of the object. In some embodiments, operation 404 may be performed by vector module 232_3 in object detecting device 230.

At operation 405, the object detective device may send the first feature vector of the first object to the server. Furthermore, the object detective device may optionally send the second feature vector of the second object to the server. In some embodiments, operation 405 may be performed by. Tx/Rx device 234 in object detecting device 230.

At operation 406, the object detecting device may generate auxiliary information showing whether the first feature vector and the second feature vector are associated with a same object. In some embodiments, when a feature vector is associated with an object, it may mean that the feature vector is feature vector of the object. Operation 406 is an optional operation rather than a necessary operation. When the object detecting device generates a plurality of feature vectors respectively associated with an object, the auxiliary information generated by the object detecting device may show which feature vectors are associated with the same object. For example, when the object detecting device generate 20 feature vectors based on a plurality of pictures, the object detecting device may further determines that feature vectors 1-10 are feature vectors of one object and feature vectors 11-20 are feature vectors of another object. However, in some embodiments, the object detecting device cannot determine the identifier of the one object and the identifier of the another object. An identifier of an object may indicate the identity of the object. In some embodiments, operation 406 may be performed by tracking module 232_4 in object detecting device 230.

At operation 407, the object detecting device may send the auxiliary information to the server. In some embodiments, the auxiliary information may make the server to recognize an object more efficiently. In some embodiments, operations 406 and 407 may follow operation 403, 404 or 405. In some embodiments, operation 407 may be performed by. Tx/Rx device 234 in object detecting device 230.

At operation 408, the server determines whether the first object is recognizable based on the first feature vector. In some embodiments, the server may further determine whether the second object is recognizable based on the second feature vector. The server may determine whether the first object and/or the second object are recognizable without the auxiliary information.

In some embodiments, the server receives a plurality of feature vectors, the server may determine whether the plurality of feature vectors are recognizable with auxiliary information received at operation 407. The auxiliary information is associated with the plurality of feature vectors.

For example, if the object detecting device obtains a plurality of pictures and determines 20 feature patterns from the a plurality of pictures, the object detecting device may consequently generate 20 feature vectors, such as feature vectors 1 to 20, based on the 20 feature patterns. The object detecting device may determine which feature vectors are associated with one object. The object detecting device may determine that feature vectors 1 to 10 are associated with an object and feature vectors 11 to 20 are associated with another object. Then the object detecting device may send the server auxiliary information showing that feature vectors 1 to 10 are associated with one object and feature vectors 11 to 20 are of another object. However, the object detecting device cannot determine the identifiers of the one object and the other object.

After the server determines that feature vector 2 is associated with the first object, the server may determine that all of feature vectors 1-10 are associated with the first object. After the server determines that feature vector 15 is associated with the second object, the server may determine that all of feature vectors 11-20 are associated with the second object. In this way, the server doesn't have to determine whether all the 20 feature vectors are recognizable one by one. When the server determines that a feature vector is recognizable, it may mean that the server may determine the identifier of the first object, such as the name of the first object. After the first feature vector of the first object is recognized, method 400 may go to operation 409. When the server determines that the first feature vector of the first object is unrecognizable, method 400 may go to operation 410. In some embodiments, operation 408 may be performed by verification module 232_5 in server 210.

At operation 409, the server may use the first feature vector of the first object and the identifier of the first object to train the ability of recognizing the first object. For example, training the ability may include saving a first correspondence, where the first correspondence may be a correspondence between the first feature vector of the first object and the identifier of the first object. In another example, the server may save an alternative correspondence, where the alternative correspondence may be a correspondence between a simplified first feature vector of the first object and the identifier of the first object. The alternative correspondence actually may be considered as being generated based on the first correspondence. When the server recognizes the first object based on the alternative correspondence, it can be understood as that the first object is recognized based on the first correspondence.

In some embodiments, when a new feature vector, which are the same as, similar to or matches the first feature vector or the simplified first feature vector, are received by the server, the server may recognize the new feature vector as feature vector associated with the first object. In some embodiments, when the server has a plurality of recognized feature vectors of the first object, it may use the plurality of recognized feature vectors to further train the ability of recognizing the first object. In some embodiments, operation 409 may be performed by verification module 232_5 in server 210.

At operation 410, the object detecting device may receive an instruction from the server. The instruction may inform the object detecting device of performing verification on the first object. For example, the instruction may inform the object detecting device of performing verification on an object associated with the first feature vector. The object associated with the first feature vector actually is the first object itself.

Based on the instruction, the object detecting device may perform verification on the first object. In some embodiments, the object detecting device may request the first object to input a password or any other information may be used to verify the first object. The input of the password may be via a microphone or a keyboard of the object detecting device. If the verification is successful, method 400 may go to operation 411. If the verification doesn't succeed, method 400 may go to operation 412.

In some embodiments, if the server also fails to recognize the second object, the object detecting device may further perform verification on the second object based on an instruction from the server.

In some embodiments, operation 410 may be performed by verification module 232_3 in object detecting device 232.

At operation 411, the object detecting device may request the first object to input a first identifier, such as the name of the first object. After that, the object detecting device may determine that the first identifier is associated with the first feature vector. Furthermore, the object detecting device may inform the server that the first identifier is associated with the first feature vector. The server may use the first identifier and the first feature vector to train the ability of recognizing the first object at operation 409. In some embodiments, operation 411 may be performed by verification module 232_3 in object detecting device 232.

At operation 412, the object may perform an exception action. For example, the exception action may be sending an alarm. In some embodiments, operation 412 may be performed by verification module 232_5 in object detecting device 232.

While several embodiments have been provided in the present disclosure, it should be understood that the disclosed methods and devices might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

What is claimed is:

1. A method for detecting identification, comprising:
obtaining, by an object detecting device of a network, a first picture comprising a first object at a first time instant and a second picture comprising a second object at a second time instant;
generating, by the object detecting device, a first feature vector of the first object based on the first picture and a second feature vector of the second object based on the second picture;
sending, by the object detecting device, the first feature vector and the second feature vector to a server;
obtaining, by the object detection device, basic pattern information of the first object and basic pattern information of the second object;
determining, by the object detecting device, that the first feature vector and the second feature vector are associated with a same object, based on the basic pattern information of the first object and the basic pattern information of the second object;
receiving, by a server of the network, a message from the object detecting device, wherein the message indicates that the first feature vector and the second feature vector are associated with the same object; and
recognizing, by the server of the network, the second object without recognizing the second feature vector based on the received message.

2. The method of claim 1, further comprising:
receiving, by the object detecting device, a message from the server, wherein the message indicates performing a verification on the first object.

3. The method of claim 2, further comprising:
determining, by the object detecting device, that the verification on the first object is successful;
receiving, by the object detecting device, an identifier of the first object from the first object; and
sending, by the object detecting device, the identifier of the first object to the server.

4. The method of claim 1, comprising:
receiving, by the object detecting device, updating information for an algorithm used for generating a set of feature vectors of an object from the server; and
updating, by the object detecting device, the algorithm based on the received updating information.

5. The method of claim 1, further comprising:
determining, by the object detecting device, a first feature pattern of the first object based on the first picture;
determining, by the object detecting device, a second feature pattern of the second object based on the second picture;
generating, by the object detecting device, a first feature map of the first object based on the first feature pattern;
generating, by the object detecting device, a second feature map of the second object based on the second feature pattern,
wherein the first feature pattern is a pattern of a particular feature of the first object, the second feature pattern is a pattern of a particular feature of the second object, and wherein the particular feature of the first object and the particular feature of the second object distinguish the first object and the second object from other objects.

6. The method of claim 5, wherein the first feature map includes three-dimensional parameters based on the first feature pattern, the second feature map includes three-dimensional parameters based on the second feature pattern.

7. The method of claim 1, wherein the first feature vector includes one-dimensional parameters based on the first feature map.

8. The method of claim 1, wherein the first picture is obtained by receiving from another device or capturing by the object detecting device.

9. A network, comprising:
an object detecting device configured to:
obtain a first picture comprising a first object at a first time instant and a second picture comprising a second object at a second time instant;
generate a first feature vector of the first object based on the first picture and a second feature vector of the second object based on the second picture;
send the first feature vector and the second feature vector to a server;
obtain basic pattern information of the first object and basic pattern information of the second object;
determine that the first feature vector and the second feature vector are associated with a same object, based on the basic pattern information of the first object and the basic pattern information of the second object; and a server configured to:
receive a message from the object detecting device, wherein the message indicates that the first feature vector and the second feature vector are associated with the same object; and
recognize the second object without recognizing the second feature vector based on the received message.

10. The network of claim 9, wherein the object detecting device is further configured to:
receive a message from the server, wherein the message indicates performing a verification on the first object.

11. The network of claim 10, wherein the object detecting device is further configured to:
determine that the verification on the first object is successful;
receive an identifier of the first object from the first object; and
send the identifier of the first object to the server.

12. The network of claim 9, wherein the object detecting device is further configured to:
receive updating information for an algorithm used for generating a set of feature vectors of an object from the server; and
update the algorithm based on the received updating information.

13. The network of claim 9, wherein the object detecting device is further configured to:
determine a first feature pattern of the first object based on the first picture;
determine a second feature pattern of the second object based on the second picture;
generate a first feature map of the first object based on the first feature pattern; and
generate a second feature map of the second object based on the second feature pattern,
wherein the first feature pattern is a pattern of a particular feature of the first object, the second feature pattern is a pattern of a particular feature of the second object, and wherein the particular feature of the first object and the particular feature of the second object distinguish the first object and the second object from other objects.

14. The network of claim 13, wherein the first feature map includes three-dimensional parameters based on the first feature pattern, the second feature map includes three-dimensional parameters based on the second feature pattern.

15. The network of claim 9, wherein the first feature vector includes one-dimensional parameters based on the first feature map.

16. The network of claim 9, wherein the first picture is obtained by receiving from another device or capturing by the object detecting device.

17. The method of claim 1, wherein the first feature map includes three-dimensional parameters of the first object, and the second feature map includes three-dimensional parameters of the second object.

18. The method of claim 17, wherein the generating the first feature vector of the first object comprising:
generating, by the object detecting device, a first feature vector that comprises one-dimensional parameters of the first object based on the three-dimensional parameters by applying a plurality of operation layers to the three-dimensional parameters, wherein an input of an operation layer k is an output of the previous operation layer k−1, an input of a first operation layer is the three-dimensional parameters, and an output of a last operation layer is the one-dimensional parameters, and wherein k is an integer not less than 1.

19. The network of claim 9, wherein the first feature map includes three-dimensional parameters of the first object, and the second feature map includes three-dimensional parameters of the second object.

20. The network of claim 19, wherein the object detecting device is further configured to:
generate a first feature vector that comprises one-dimensional parameters of the first object based on the three-dimensional parameters by applying a plurality of operation layers to the three-dimensional parameters, wherein an input of an operation layer k is an output of the previous operation layer k−1, an input of a first operation layer is the three-dimensional parameters, and an output of a last operation layer is the one-dimensional parameters, and wherein k is an integer not less than 1.

* * * * *